US012145037B1

(12) United States Patent
Liu

(10) Patent No.: US 12,145,037 B1
(45) Date of Patent: Nov. 19, 2024

(54) GOLF HOLE LIGHTING DEVICE

(71) Applicant: Shenzhen Jintuo E-commerce Co., Ltd., Shenzhen (CN)

(72) Inventor: Genhai Liu, Shenzhen (CN)

( * ) Notice: Subject to any disclaimer, the term of this patent is extended or adjusted under 35 U.S.C. 154(b) by 0 days.

(21) Appl. No.: 18/402,457

(22) Filed: Jan. 2, 2024

(30) Foreign Application Priority Data

Oct. 8, 2023 (CN) ......................... 202322700810.5

(51) Int. Cl.
*A63B 57/30* (2015.01)
*F21V 33/00* (2006.01)

(52) U.S. Cl.
CPC .......... *A63B 57/357* (2015.10); *F21V 33/008* (2013.01); *A63B 2225/74* (2020.08)

(58) Field of Classification Search
CPC .. A63B 57/357; A63B 2225/74; F21V 33/008
See application file for complete search history.

(56) References Cited

U.S. PATENT DOCUMENTS 3,745,697 A * 7/1973 Wang .................... A63B 67/16 446/242
2006/0109662 A1* 5/2006 Reiff ...................... F21V 25/12 362/373
2009/0059572 A1* 3/2009 Wang ...................... F21S 9/037 362/183
2010/0151972 A1* 6/2010 Lim .................... A63B 57/207 473/406
2010/0160088 A1* 6/2010 Tan ........................ A63B 57/10 473/390
2014/0185278 A1* 7/2014 Burkart ................ F21V 33/008 362/183
2016/0252243 A1* 9/2016 Garcia ................... A63B 57/40 362/362
2017/0184260 A1* 6/2017 Munoz Abogabir ........................ F21V 23/023
2020/0164256 A1* 5/2020 Burch ................ A63B 71/0622
2022/0323839 A1* 10/2022 Thrash .................. F21V 33/008

* cited by examiner

*Primary Examiner* — Eugene L Kim
*Assistant Examiner* — Christopher Glenn

(57) ABSTRACT

A golf hole lighting device includes a shell suitable for being used in a golf hole and a luminous body arranged in the shell. The luminous body emits light in a direction towards a top of the shell. An optical lens having a protruding top surface and configured to condense light is arranged at a position, corresponding to the luminous body, on a top surface of the shell. When the luminous body emits light, the optical lens is configured to achieve effects of focusing light, improving the light intensity, and controlling a shape of a beam, so that the light emitted by the luminous body is more concentrated, the uniformity and quality of the light are improved, and dazzling is reduced. The light from the golf hole is better focused and softer, so that a user can effectively determine a position of the golf hole.

19 Claims, 8 Drawing Sheets

GOLF HOLE LIGHTING DEVICE

CROSS-REFERENCE TO RELATED APPLICATIONS

The application claims priority of Chinese patent application NO.2023227008105, filed on 2023 Oct. 8, which is incorporated herein by reference in its entireties.

TECHNICAL FIELD

The present disclosure relates to the technical field of lighting technologies. This application claims the priority of the preceding application No. 2023227008105, filed on Oct. 8, 2023 and entitled Golf Hole Lighting Device.

BACKGROUND

Due to fast-paced busy work during the day, it is more and more popular that people play golf at night for relaxation. For the convenience for a user to play golf at night, the user will carry a lamp suitable for being used in a golf hole. The user places the lamp inside the golf hole, and light can be emitted from an opening of the goal hole, so that the user can quickly find the golf hole at night.

The existing lamps suitable for being used in the golf holes generally include a surface shell, a bottom shell connected to the surface shell to form an accommodating chamber, and a luminous body arranged in the accommodating chamber. The surface shell is a light-transmittance shell, which is configured to output light emitted by the luminous body, but directly using the light-transmittance shell to output the light will lead to non-uniform light outputting, light pollution, and dazzling, which affects the sight and playing experience of a player.

SUMMARY

The present disclosure aims to provide a golf hole lighting device, which is used to solve the problem of poor lighting effect of the light output by the existing golf hole lamp.

In order to solve the technical problem, the technical scheme provided by the present disclosure is as follows.

A golf hole lighting device, including a shell suitable for being used in a golf hole, and a luminous body arranged in the shell, wherein the luminous body emits light in a direction towards a top of the shell; and an optical lens having a protruding top surface and configured to condense light is arranged at a position, corresponding to the luminous body, on a top surface of the shell.

Further, one side surface of the optical lens away from the luminous body is a spherical surface.

Further, one side off the optical lens close to the luminous body is sunken towards one side away from the luminous body to form an indented surface.

Further, the indented surface is spherical, and a thickness of the optical lens gradually decreases from a circumferential side to a central position.

Further, the shell protrudes downwards at a position corresponding to the luminous body to form an annular enclosure wall with an accommodating cavity; the annular enclosure wall is arranged around a circumferential side of the indented surface; and the luminous body is placed in the accommodating cavity.

Further, the golf hole lighting device further includes a battery and a circuit board which are arranged on the shell, wherein the luminous body is arranged on the circuit board; a bottom surface of the annular enclosure wall resists against the circuit board; both the battery and the luminous body are electrically connected to the circuit board; and the battery is located below the circuit board.

Further, the shell includes a bottom shell and a upper shell connected to the bottom shell to form an mounting chamber; the battery and the circuit board are both arranged in the mounting chamber; the optical lens and the annular enclosure wall are both located on the upper shell; and a material of the upper shell is a light-transmittance material.

Further, the optical lens is integrally formed with the upper shell; and an embossed structure is formed at a position, avoiding the optical lens and the annular enclosure wall, on a bottom surface of the upper shell.

Further, the bottom shell is provided with a plurality of counterbore studs; the upper shell is provided with support studs at positions corresponding to the counterbore studs; the circuit board is provided with avoidance holes at positions corresponding to the counterbore studs; the counterbore studs are arranged in the avoidance holes in a penetrating manner; the counterbore studs are locked with the support studs through screws; and the bottom shell is provided with support blocks on circumferential sides of the counterbore bolts.

Further, the battery is a dry battery; a placement chamber for placing the battery is formed on the bottom shell; the bottom shell is provided with a battery cover at a position corresponding to the placement chamber; a lower surface of the battery cover is an arc surface; and a height of each counterbore stud is greater than a height of the placement chamber.

Further, a bottom surface of the bottom shell is provided with an embedding slot; the battery cover is arranged inside the embedding slot; and a bottom surface of the battery cover is smoothly connected to the bottom surface of the bottom shell.

Further, a plurality of elastic pressure plates and at least one clamping block are arranged the battery cover at intervals; and the bottom shell is provided with a limiting port for use with the clastic pressure plates and a bayonet for use with each clamping block.

Further, the battery is a rechargeable battery, and the bottom shell is provided with a charging interface electrically connected to the circuit board.

Further, a bottom surface of the shell is adapted to a bottom surface of a downwards sunken structure in the golf hole; and the bottom surface of the shell protrudes downwards. Further, the top surface of the shell is a downwards sunken structure.

Further, the bottom surface of the shell is an arc surface, and the top surface of the shell is an arc surface.

Further, a through hole is formed in the middle of the shell; a cross section of the shell is annular; and the circuit board is annular or arc-shaped.

Further, a through hole is formed in the middle of the shell; a gap communicated to the through hole is formed in the shell; a cross section of the shell is C-shaped; and the circuit board is arc-shaped.

Further, a convex bar that facilitates picking up is formed on a side wall of the through hole in a protruding manner.

Further, a handle part is rotatably arranged on the side wall of the through hole; the handle part is in the shape of an arc-shaped rod; and the handle part is located below the convex bar and extends in a lengthwise direction of the convex bar.

The present disclosure has the beneficial effects below: Compared with the prior art, the optical lenses having the protruding top surfaces are arranged on the shell of the golf hole lighting device; when the luminous body emits light, the optical lenses are configured to achieve effects of focusing light, so that the light emitted by the luminous body is better focused, and the light from the golf hole forms a beam to reduce light pollution and dazzling; the light from the golf hole is better focused and softer, and diffusion of the output light to unnecessary regions is effectively controlled, so that a user can effectively determine a position of the golf hole, the lighting effect of the light of the luminous body is improved, and the user experience are improved.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Referring to FIG. 1 to FIG. 9, the embodiments of the present disclosure provide a golf hole lighting device.

Figure 1:
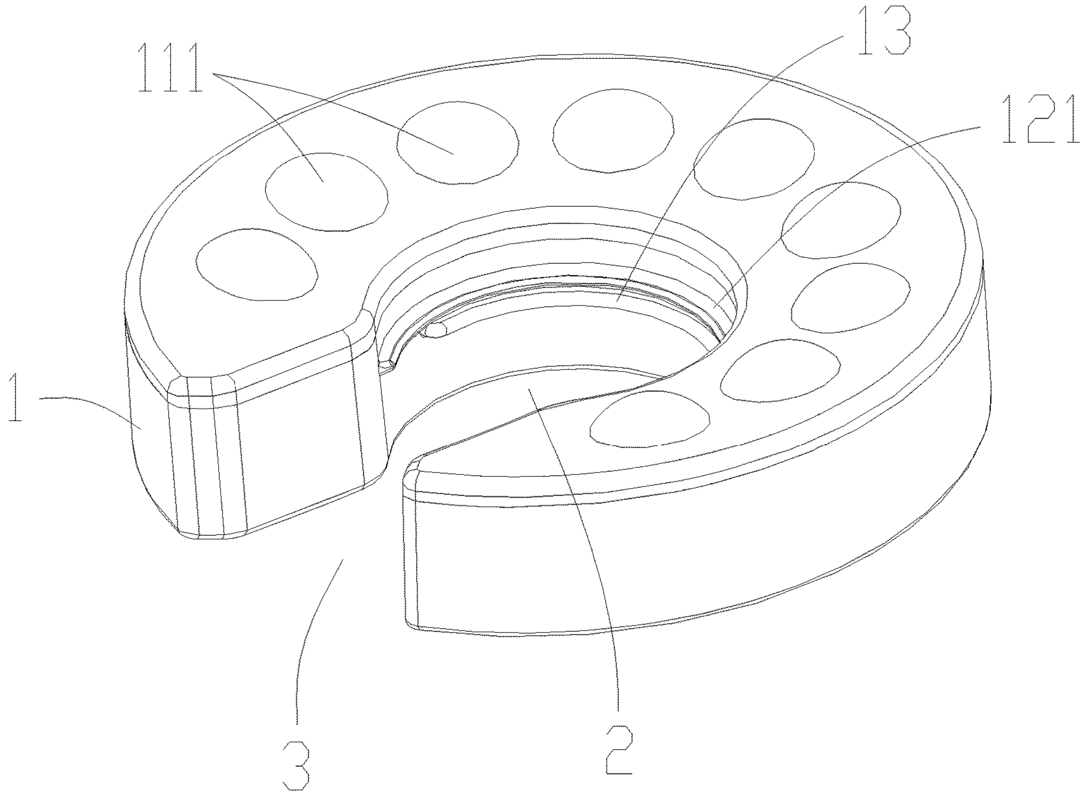
FIG. 1 is a three-dimensional diagram of a C-shaped shell according to the present disclosure.
Figure 2:
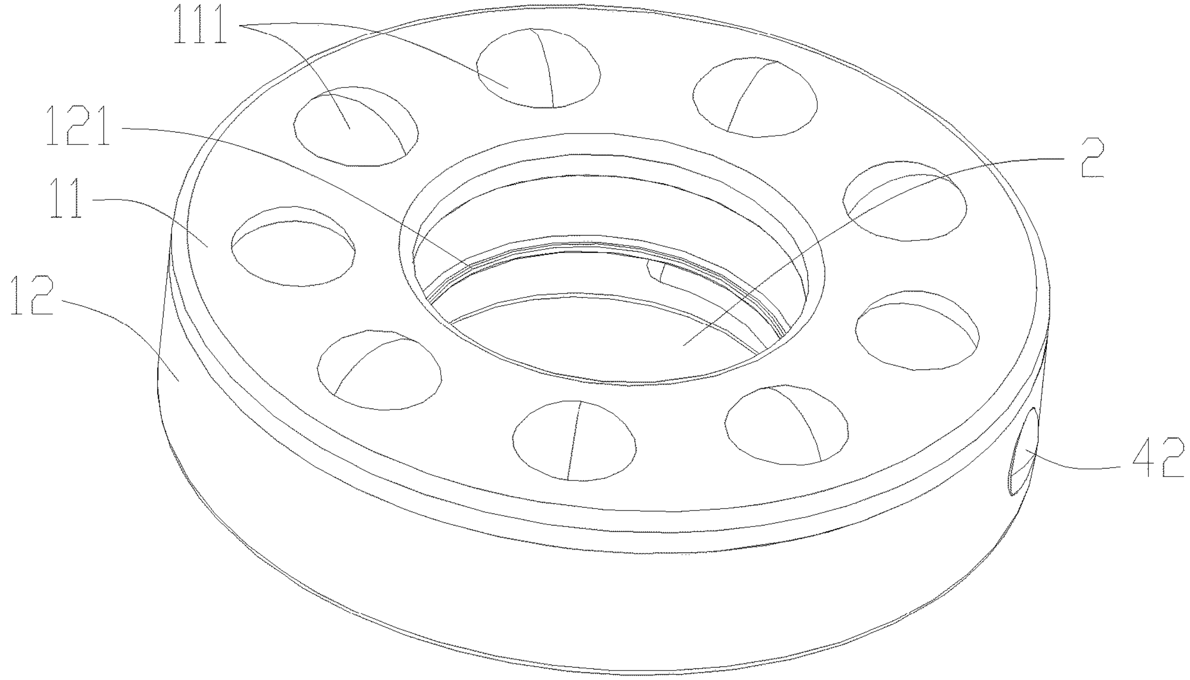
FIG. 2 is a three-dimensional diagram of an annular shell according to the present disclosure.

Referring to FIG. 1 to FIG. 2, the golf hole lighting device includes a shell 1 suitable for being used in a golf hole, and a luminous body 41 arranged in the shell 1, wherein the luminous body 41 emits light in a direction towards a top of the shell 1; and optical lenses 111 having protruding top surfaces and configured to condense light is arranged at positions, corresponding to the luminous body 41, on a top surface of the shell 1.

In this embodiment, the optical lenses 111 having the protruding top surfaces are arranged on the shell 1 of the golf hole lighting device; when the luminous body 41 emits light, the optical lenses are configured to achieve effects of focusing light, so that the light emitted by the luminous body 41 is better focused, and the light from the golf hole forms a beam to reduce light pollution and dazzling; the light from the golf hole is better focused and softer, and diffusion of the output light to unnecessary regions is effectively controlled, so that a user can effectively determine a position of the golf hole, the lighting effect of the light of the luminous body 41 is improved, and the problem of poor lighting effect of the light output by the existing golf hole lamp is solved.

Figure 4:
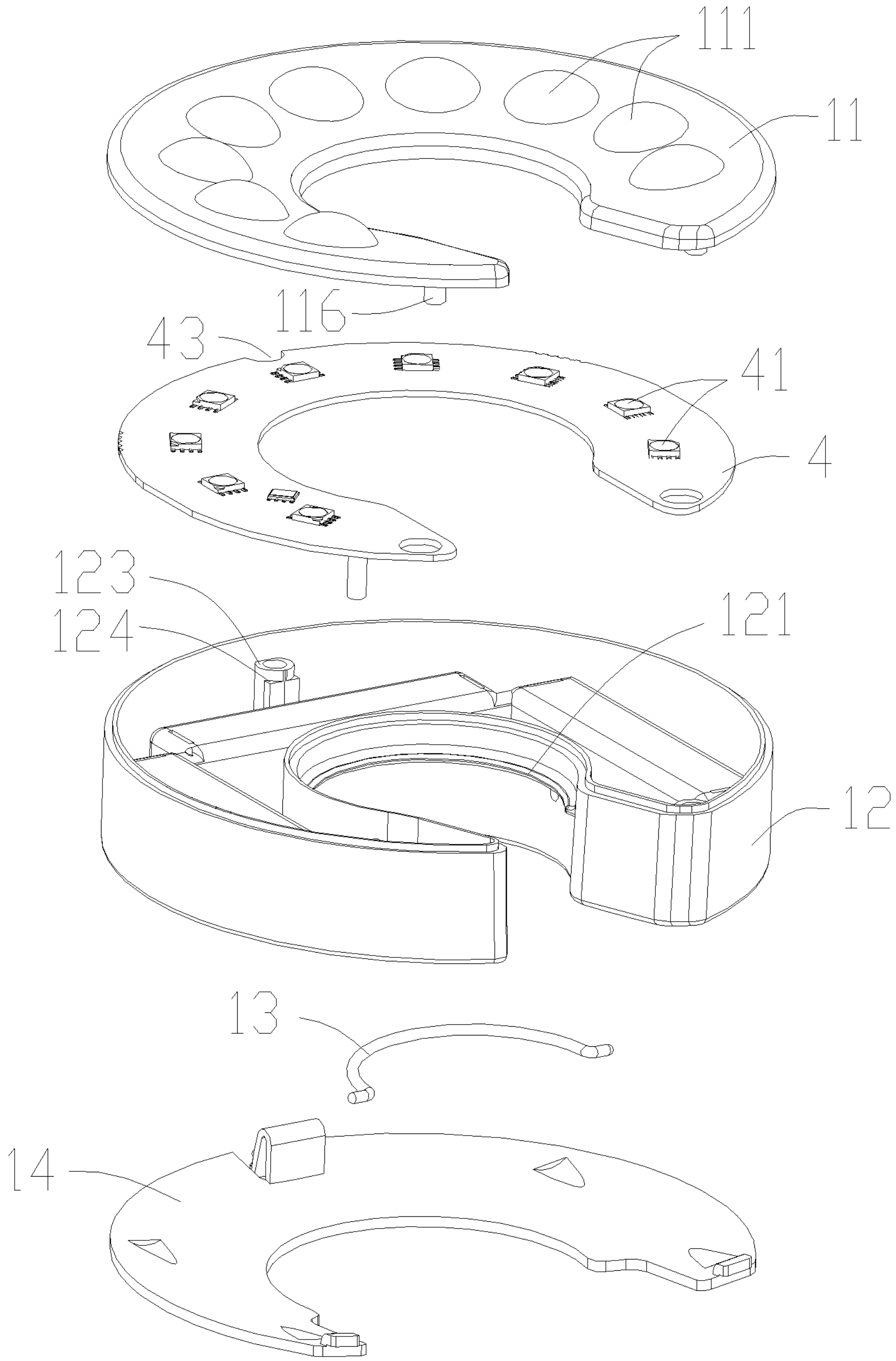
FIG. 4 is an exploded diagram of a C-shaped shell according to the present disclosure.

Referring to FIG. 4, in the above embodiment, specifically, the luminous body 41 includes a plurality of luminous elements disposed on a first surface of a circuit board 4 and arranged along an extending direction of the circuit board, the luminous element can be a light-emitting diode (LED) lamp, an LED, or the like.

Figure 6:
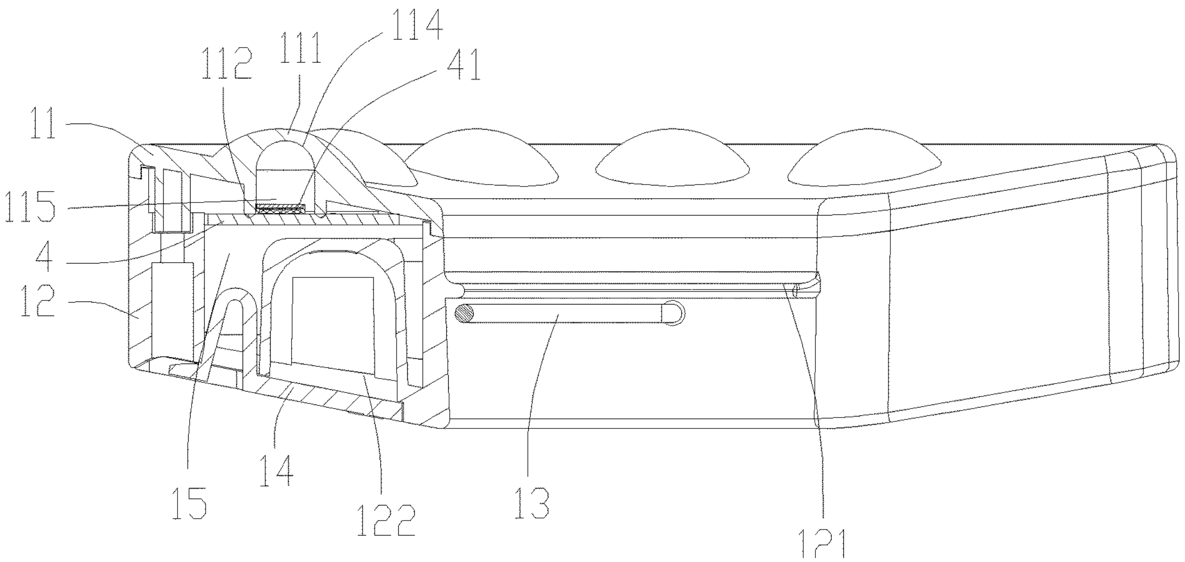
FIG. 6 is a cross-sectional view of a C-shaped shell cut along the middle of the gap according to the present disclosure.

Referring to FIG. 6, one side surface of each optical lens 111 away from the luminous body 41 is a spherical surface. By use of the spherical surface, the light emitted by the luminous body 41 is effectively diffused, so that the light at an opening of the golf hole is made to be uniform.

One side off each optical lens 111 close to the luminous body 41 is sunken towards one side away from the luminous body 41 to form an indented surface 114. Specifically, the indented surface 114 is a spherical surface, and a thickness of the optical lens 111 gradually decreases from a circumferential side to a central position, namely, the optical lens 111 is formed into a convex lens, which achieves light diffusion and can also achieve a focusing effect and improve the lighting effect.

In an embodiment, referring to FIG. 5 to FIG. 9, the shell 1 protrudes downwards at a position corresponding to the luminous body 41 to form an annular enclosure wall 112 with an accommodating cavity 115; the annular enclosure wall 112 is arranged around a circumferential side of the indented surface 114; and the luminous body 41 is placed in the accommodating cavity 115. The accommodating cavity 115 is formed through the annular enclosure wall 112 to accommodate the luminous body 41, so that the light of the luminous body 41 can be output from the optical lenses 111 in an aligned manner, to improve the focusing and lighting effects.

In one embodiment, the golf hole lighting device further includes a battery 5 and a circuit board 4 which are arranged on the shell 1, wherein the luminous body 41 is arranged on the circuit board 4; a bottom surface of the annular enclosure wall 112 resists against the circuit board 4; both the battery 5 and the luminous body 41 are electrically connected to the circuit board 4; and the battery 5 is located below the circuit board 4. Using the battery 5 to supply power to the luminous body 41 eliminates the problem of external power wiring and is convenient for carrying the golf hole lighting device of the present disclosure.

In an embodiment, for the convenience of production and manufacturing of the golf hole lighting device of this embodiment, the shell 1 includes a bottom shell 12 and an upper shell 11 connected to the bottom shell 12 to form an mounting chamber 15: the battery 5 and the circuit board 4 are both arranged in the mounting chamber 15: the optical lenses 111 and the annular enclosure wall 112 are both located on the upper shell 11; and a material of the upper shell 11 is a light-transmittance material. Specifically, the optical lenses 111 are integrally formed with the upper shell 11, and the upper shell 11 and the bottom shell 12 can be fixed by means of a buckle, a screw, pressing, adhesion, and the like.

Figure 5:
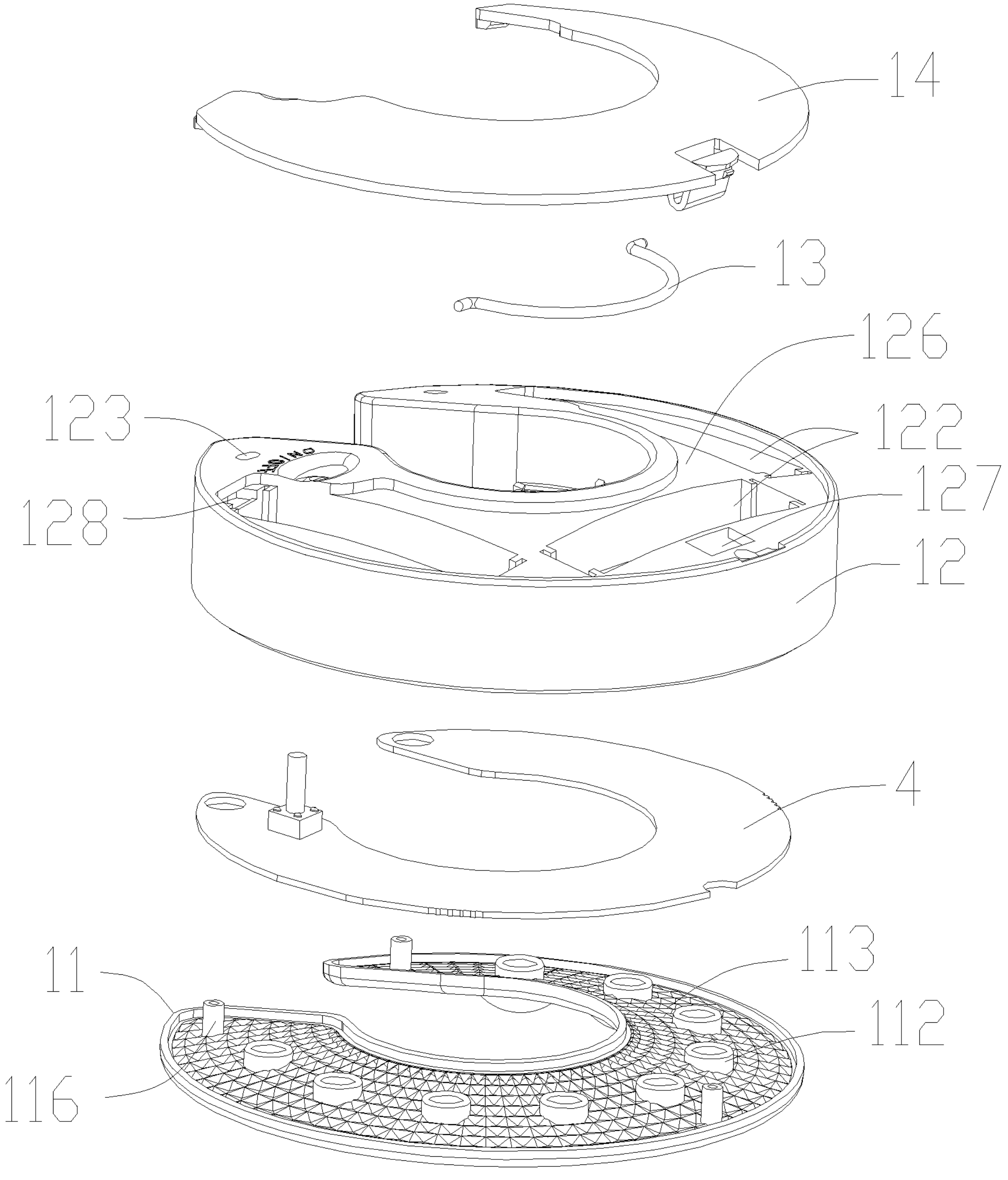
FIG. 5 is an exploded diagram of a C-shaped shell in another angle of view according to the present disclosure.

In one embodiment, referring to FIG. 5, an embossed structure 113 is formed at a position, avoiding the optical lenses 111 and the annular enclosure wall 112, on a bottom surface of the upper shell 11. The embossed structure 113 includes a plurality of embossments for scattering light formed on an inner surface of the upper shell 11 and surrounding the optical lenses 111. By use of the embossed structure 113, when the luminous body 41 emits light, the light becomes soft when passing through the embossed structure 113, so that the output light is soft.

In an embodiment, referring to FIG. 4, the bottom shell 12 is provided with a plurality of counterbore studs 123; the upper shell 11 is provided with support studs 116 at positions corresponding to the counterbore studs 123; the circuit board 4 is provided with avoidance holes 43 at positions corresponding to the counterbore studs 123: the counterbore studs 123 are arranged in the avoidance holes 43 in a penetrating manner; the counterbore studs 123 are locked with the support studs 116 through screws, to stably fix the bottom shell 12 and the upper shell 11. The bottom shell 12 is provided with support blocks 124 on circumferential sides of the counterbore bolts 123. A bottom surface of the circuit board 4 resists against surfaces of the support blocks 124. The support blocks 124 are matched with the annular enclosure wall 112 to compress the circuit board 4 when the bottom shell 12 is connected to the upper shell 11, so as to stably fix the circuit board 4 in the mounting chamber 15.

In an embodiment, referring to FIG. 3 to FIG. 7, the battery 5 is a dry battery 5; a placement chamber 122 for placing the battery 5 is formed on the bottom shell 12; the bottom shell 12 is provided with a battery cover 14 at a position corresponding to the placement chamber 122; a lower surface of the battery cover 14 is an arc surface; and a height of each counterbore stud 123 is greater than a height of the placement chamber 122. That is, the circuit board 4 can be located in the mounting chamber 15 and will not hinder the mounting of the battery 5, so as to reasonably distribute the battery 5 and the circuit board 4. Specifically, there are a plurality of batteries 5. For example, there may be three batteries 5 and three placement chambers 122, which are all uniformly distributed around a central axis of the shell 1.

In an embodiment, when there are a plurality of placement chambers 122, an area of the battery cover 14 can cover openings of the plurality of placement chambers 122 to protect the battery 5. Furthermore, specifically, a plurality of elastic pressure plates 141 and at least one clamping block 142 are arranged the battery cover 14 at intervals; and the bottom shell 12 is provided with limiting ports 127 for use with the clastic pressure plates 141 and a bayonet 128 for use with each clamping block 142. When the battery cover 14 is mounted on the bottom shell 12, the elastic pressure plates 141 are arranged inside the limiting ports 127, and the clamping block 142 is arranged inside the bayonet 128. Due to the limitation by the clamping block 142 and the bayonet 128, the battery cover 14 can be mounted on the bottom shell 12 by the elasticity of the elastic pressure plates 141. Moreover, by use of the plurality of clastic pressure plates 141, it is convenient for the user to remove the battery cover 14 from the bottom shell 12 and to replace the battery 5.

In an embodiment, a bottom surface of the bottom shell 12 is provided with an embedding slot 126; the battery cover 14 is arranged inside the embedding slot 126; and a bottom surface of the battery cover 14 is smoothly connected to the bottom surface of the bottom shell 12. That is, the bottom surface of the battery cover 14 is a part of the bottom surface of the shell 1 to keep the bottom surface of the shell 1 attractive.

Figure 8:
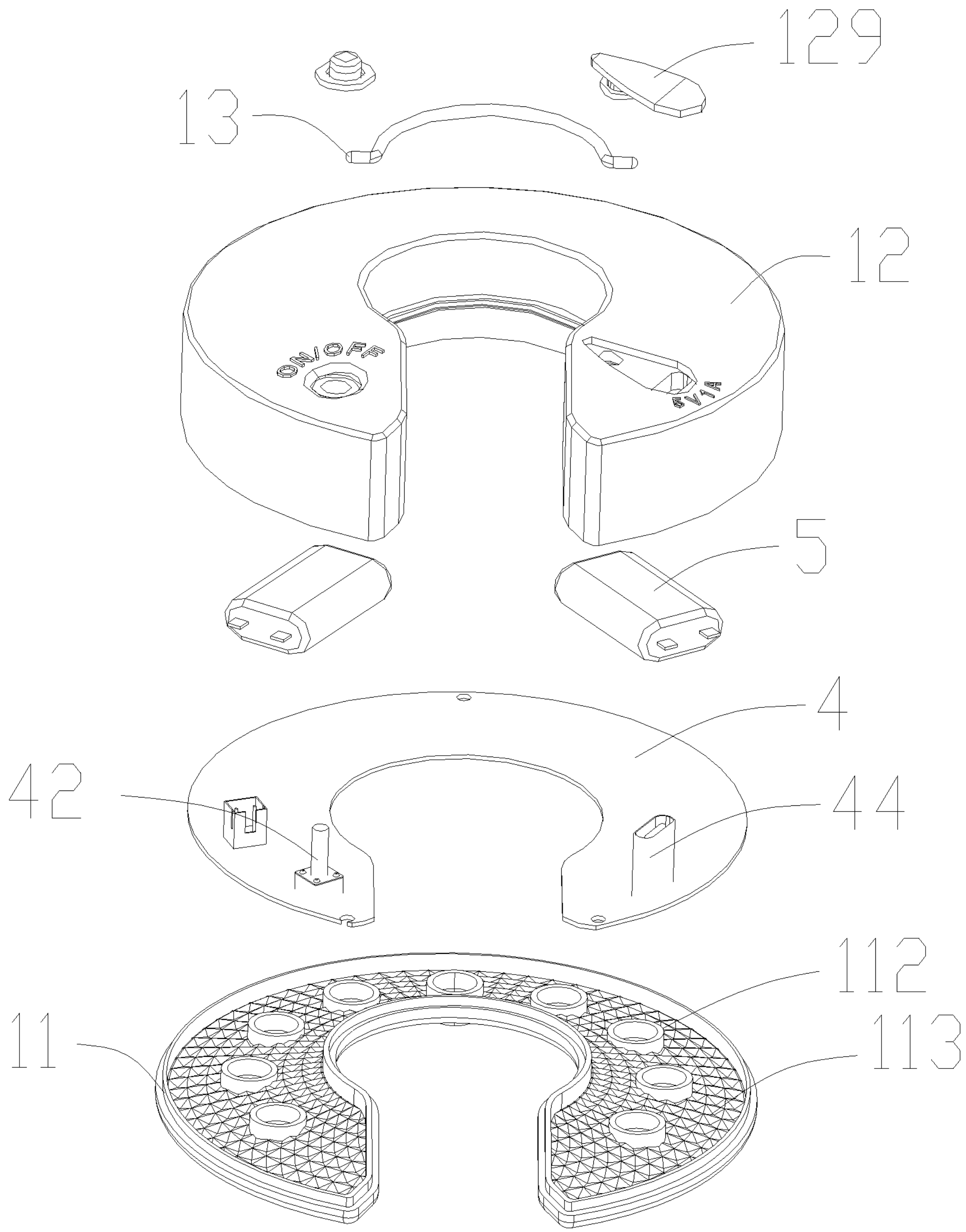
FIG. 8 is an exploded diagram of a C-shaped shell and a rechargeable battery according to the present disclosure.
Figure 9:
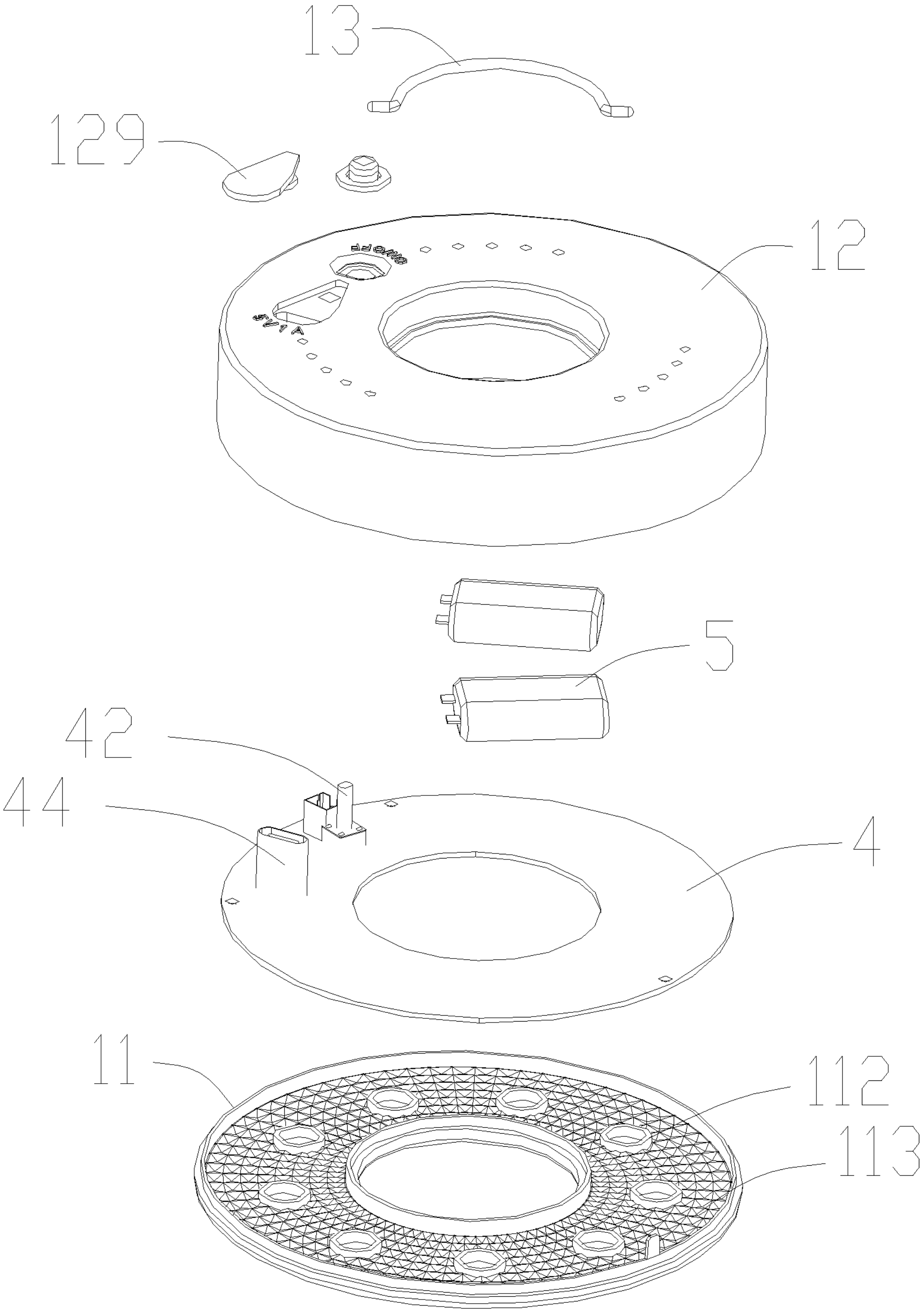
FIG. 9 is an exploded diagram of an annular shell and a rechargeable battery according to the present disclosure.

In other embodiments, referring to FIG. 8 to FIG. 9, the battery 5 is a rechargeable battery 5, and the bottom shell 12 is provided with a charging interface 44 electrically connected to the circuit board 4. The charging interface 44 is used for connection to an external power supply, and the battery 5 can be charged through the circuit board 4.

In an embodiment, referring to FIG. 6, a bottom surface of the shell 1 is adapted to a bottom surface of a downwards sunken structure in the golf hole; and the bottom surface of the shell 1 protrudes downwards. The bottom surface is set to be the downwards protruding structure that is adapted to the bottom surface of the downwards sunken structure in the golf hole. In this way, when the golf hole lighting device is placed inside the golf hole, the bottom surface of the lighting device is matched with the ground in the golf hole, so that the lighting device can be stably placed at the bottom of the golf hole, and can be prevented from tilting, causing the light to tilt. The light from the lighting device is output upwards from the opening, so as to facilitate the user to confirm the position of the golf hole, which solves the problem of affecting the confirmation of the position of the golf hole by the user due to the fact that the bottom surface of the lamp suitable for being used in the golf hole is a plane that is not applicable to a golf hole with a downwards sunken bottom surface.

Specifically, when the bottom surface of the golf hole is an arc surface, the bottom surface of the shell 1 is a downwards protruding arc surface to abut against the bottom surface of the golf hole, facilitating the stable placement of the golf hole lighting device of the present disclosure.

In an embodiment, the top surface of the shell 1 is a downwards sunken structure, that is, a top surface of the upper shell 11 is a downwards sunken structure to better receive a golf ball. Furthermore, when the golf ball falls into the golf hole, it is convenient to take the golf ball. Specifically, the top surface of the shell 1 is a downwards sunken arc surface, slope, or the like.

Figure 3:
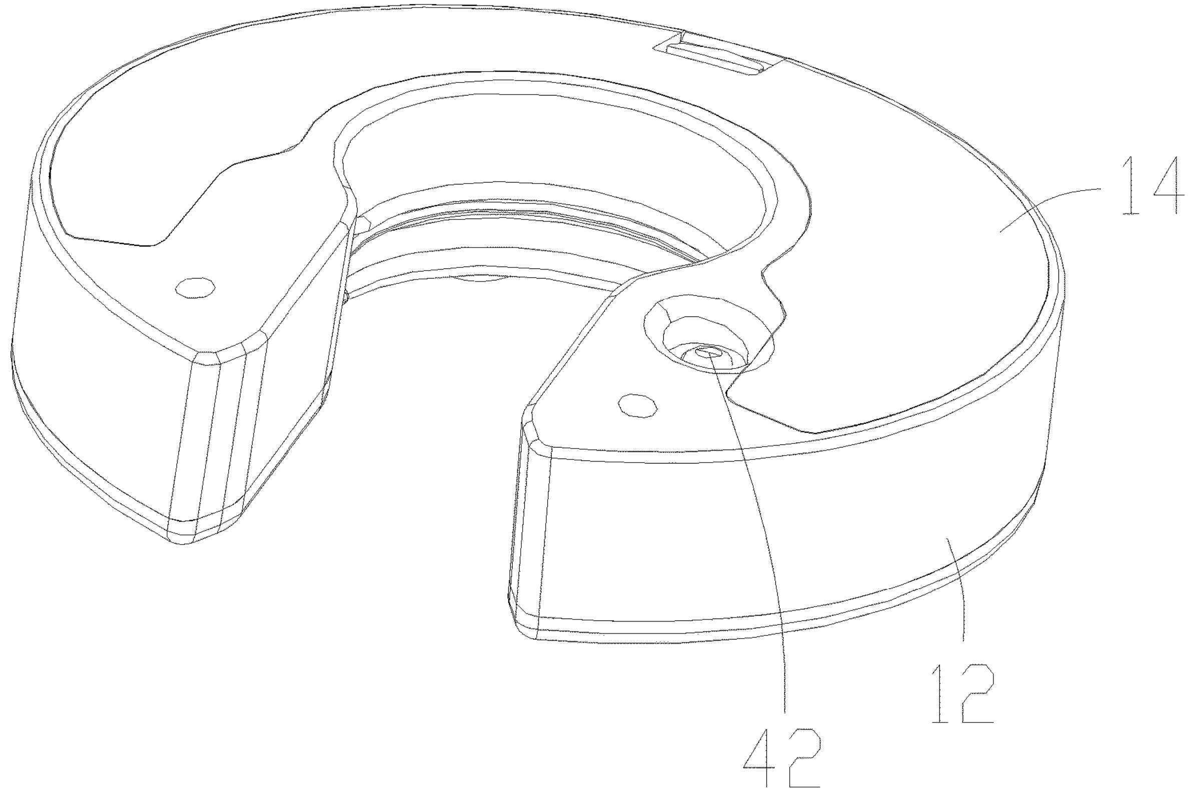
FIG. 3 is a three-dimensional diagram of a C-shaped shell in another angle of view according to the present disclosure.

In the above embodiments, referring to FIG. 2 to FIG. 3, the shell 1 is provided with a functional button 42 that is electrically connected to the circuit board 4. Through the functional button 42, the luminous body 41 can be controlled to be turned on, turned off, change a color of a lamp tube, or the like. Specifically, the functional button 42 can be arranged on a side wall, bottom, or even top of the shell 1 according to requirements of a manufacturer.

Figure 7:
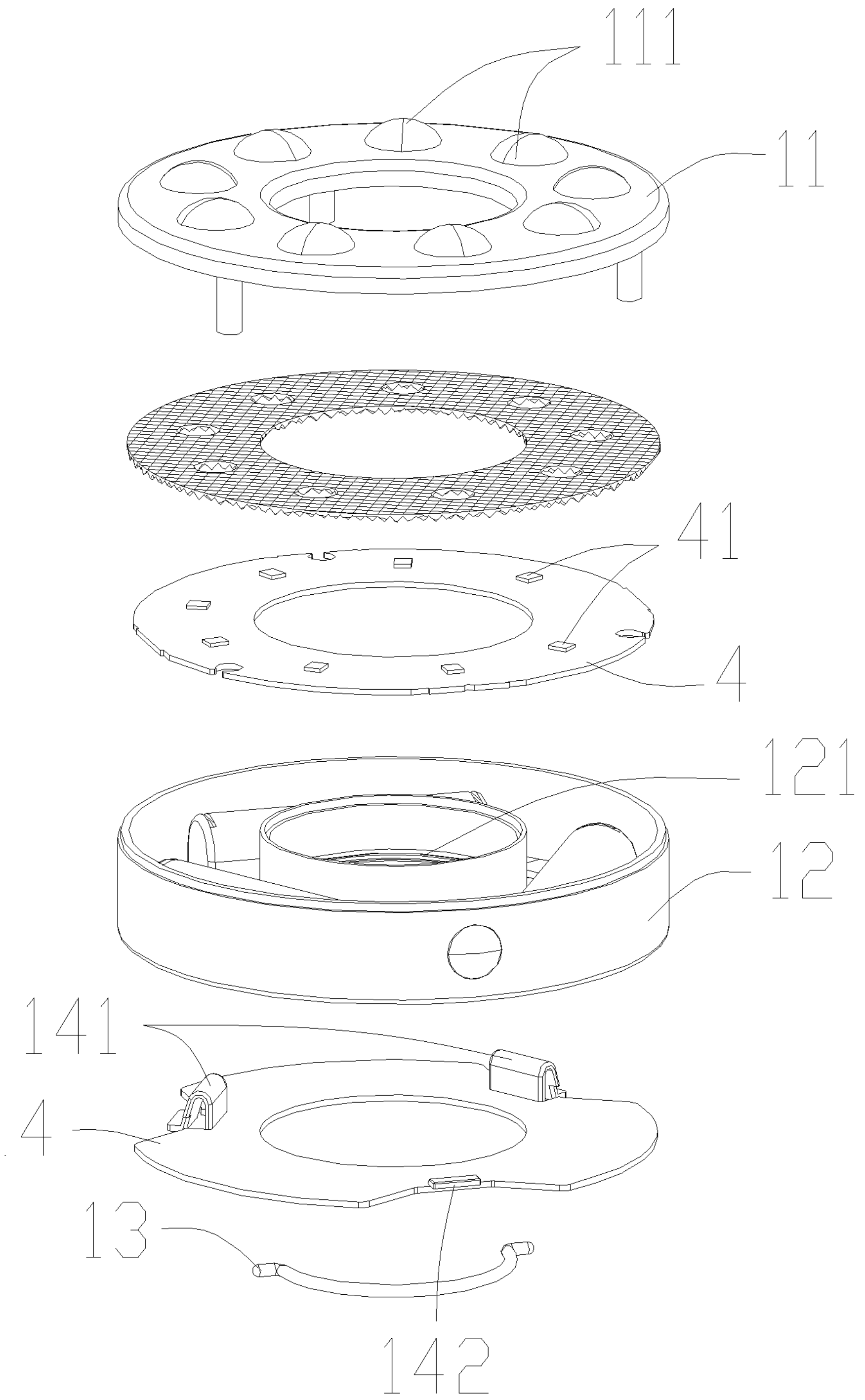
FIG. 7 is an exploded diagram of an annular shell and a dry battery according to the present disclosure.

In an embodiment, referring to FIG. 2 and FIG. 7, a through hole 2 is formed in the middle of the shell 1, which means that the shell 1 can be annular and can be easily inserted into a golf club through the through hole 2. The circuit board 4 is adapted to the shell 1 and can also be annular or arc-shaped. There are a plurality of the luminous bodies 41, which are uniformly distributed around the central axis of the shell 1.

In an embodiment, referring to FIG. 1 and FIG. 3 to FIG. 6, a through hole 2 is formed in the middle of the shell 1, and a gap 3 that is communicated to the through hole 2 is formed in the shell 1. The circuit board 4 is arc-shaped, so that the overall golf hole lighting device of the present disclosure is similar to a C. When the golf hole lighting device of the present disclosure is placed inside the golf hole, the C shape can be used for easy adjustment of a position and easy picking up.

In an embodiment, a convex bar 121 that facilitates picking up is formed on a side wall of the through hole 2 in a protruding manner. By use of the convex bar 121, it is convenient to place the golf hole lighting device of the present disclosure into the golf hole and to take the golf hole lighting device of the present disclosure out of the golf hole. A handle part 13 is rotatably arranged on the side wall of the through hole 2; and the handle part 13 is in the shape of an arc-shaped rod. The handle part 13 is located below the convex bar 121 and extends in a lengthwise direction of the convex bar 121. By use of the handle part 13, it is convenient for the user to carry the golf hole lighting device in daily life and take the golf hole lighting device out of the golf hole. Specifically, a material of the handle part 13 can be metal, alloy, plastic, or the like.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A golf hole lighting device, comprising a shell suitable for being used in a golf hole, and a luminous body arranged in the shell and a circuit board, wherein the luminous body emits light in a direction towards a top of the shell, the shell is annular or arc-shaped, the circuit board is annular or arc-shaped and arranged in the shell, the luminous body comprising a plurality of luminous elements disposed on a first surface of the circuit board and arranged along an extending direction of the circuit board;

the shell comprising a bottom shell and an upper shell connected to the bottom shell to form a mounting chamber receiving the luminous body and the circuit board, a plurality of optical lenses disposed on the upper shell and corresponding to the plurality of luminous elements, each optical lens having a protruding top surface and configured to condense light from a corresponding one luminous element of the plurality of luminous elements; and an embossed structure comprising a plurality of embossments for scattering light formed on an inner surface of the upper shell and surrounding the optical lenses.

2. The golf hole lighting device according to claim 1, wherein one side surface of the optical lens away from the luminous body is a spherical surface, one side of the optical lens close to the luminous body is sunken towards one side away from the luminous body to form an indented surface, the indented surface is spherical, and a thickness of the optical lens gradually decreases from a circumferential side to a central position.

3. The golf hole lighting device according to claim 1, wherein a plurality of annular enclosure walls are connected to an inner side of the upper shell and corresponding to the plurality of luminous elements, each enclosure wall also contact with the first surface and surrounding the corresponding one luminous element, an inner surface of each enclosure wall, an inner surface of a corresponding one optical lens of the plurality of optical lenses and the first surface form a accommodating cavity, the corresponding one luminous element is located in the accommodating cavity.

4. The golf hole lighting device according to claim 3, wherein the golf hole lighting device further comprises a battery arranged in the mounting chamber: both the battery and the luminous body are electrically connected to the circuit board; and the battery is located below the circuit board.

5. The golf hole lighting device according to claim 3, wherein the optical lens, the annular enclosure walls, and embossed structure are integrally formed with the surface upper shell.

6. The golf hole lighting device according to claim 5, wherein the bottom shell is provided with a plurality of counterbore studs; the upper shell is provided with support studs at positions corresponding to the counterbore studs; the circuit board is provided with avoidance holes at positions corresponding to the counterbore studs: the counterbore studs are arranged in the avoidance holes in a penetrating manner: the counterbore studs are locked with the support studs through screws; the bottom shell is provided with support blocks on circumferential sides of the counterbore bolts, a bottom surface of the circuit board contracts an upper surfaces of the support blocks, and the support blocks are matched with the annular enclosure walls to fix the circuit board in the mounting chamber when the bottom shell is connected to the upper shell.

7. The golf hole lighting device according to claim 6, wherein the battery is a dry battery: a placement chamber for placing the battery is formed on the bottom shell: the bottom shell is provided with a battery cover at a position corresponding to the placement chamber: a lower surface of the battery cover is an arc surface; and a height of each counterbore stud is greater than a height of the placement chamber.

8. The golf hole lighting device according to claim 7, wherein a bottom surface of the bottom shell is provided with an embedding slot: the battery cover is arranged inside the embedding slot; and a bottom surface of the battery cover is smoothly connected to the bottom surface of the bottom shell.

9. The golf hole lighting device according to claim 1, wherein the battery is a rechargeable battery, the bottom shell is provided with a charging interface electrically connected to the circuit board, the charging interface is used for connecting to an external power supply, and the battery is able to be charged through the circuit board.

10. The golf hole lighting device according to claim 1, wherein a bottom surface of the bottom shell is adapted to a bottom surface of a downwards sunken structure in the golf hole; the bottom surface of the bottom shell protrudes downwards, and the bottom surface of the bottom shell is an arc surface.

11. The golf hole lighting device according to claim 10, wherein a top surface of the upper shell is an arc surface.

12. The golf hole lighting device according to claim 6, wherein a through hole is formed in the middle of the shell: a cross section of the shell is annular; and the circuit board is annular or arc-shaped.

13. The golf hole lighting device according to claim 6, wherein a through hole is formed in the middle of the shell: a gap communicated to the through hole is formed in the shell: a cross section of the shell is C-shaped; and the circuit board is arc-shaped.

14. The golf hole lighting device according to claim 12, wherein a convex bar is formed on an annular side wall of the through hole in a protruding manner, and the convex bar is annular and extends along the annular side wall.

15. The golf hole lighting device according to claim 14, further comprising a handle part rotatably connected the annular side wall of the through hole, wherein the handle part comprises two connection parts and an arc-shaped rod, each connection part is rotatably connected the annular side wall, the arc-shaped rod is connected between the two connection parts; and the handle part is located below the convex bar and extends in a lengthwise direction of the convex bar.

16. The golf hole lighting device according to claim 13, wherein a convex bar is formed on an arc-shaped side wall of the through hole in a protruding manner, and the convex bar is arc-shaped and extends along arc-shaped side wall.

17. The golf hole lighting device according to claim 16, further comprising a handle part rotatably connected the annular side wall of the through hole, wherein the handle part comprises two connection parts and an arc-shaped rod, each connection part is rotatably connected the annular side wall, the arc-shaped rod is connected between the two connection parts; and the handle part is located below the convex bar and extends in a lengthwise direction of the convex bar.

18. A golf hole lighting device, comprising a shell, a luminous body arranged in the shell, a circuit board and a battery, the luminous body comprising a plurality of luminous elements disposed on the circuit board and emitting light in a direction towards a top of the shell;

the shell comprising a bottom shell and an upper shell connected to the bottom shell to form a mounting chamber receiving the luminous body and the circuit board, a plurality of optical lenses disposed on the upper shell and corresponding to the plurality of luminous elements, each optical lens having a protruding top surface and configured to condense light from a corresponding one luminous element of the plurality of luminous elements, a battery arranged in the mounting chamber, the battery is a dry battery; a placement chamber for placing the battery is formed on the bottom shell; the bottom shell is provided with a battery cover:

wherein a plurality of elastic pressure plates and at least one clamping block are arranged the battery cover at intervals; and the bottom shell is provided with a limiting port for use with the elastic pressure plates and a bayonet for use with each clamping block.

19. A golf hole lighting device, comprising a shell suitable for being used in a golf hole, and a luminous body arranged in the shell and a circuit board, wherein the luminous body emits light in a direction towards a top of the shell, the shell is annular or arc-shaped, the circuit board is annular or arc-shaped and arranged in the shell, the luminous body comprising a plurality of luminous elements disposed on a first surface of the circuit board and arranged along an extending direction of the circuit board; and the shell comprising a bottom shell and an upper shell connected to the bottom shell to form a chamber receiving the luminous body and the circuit board, a plurality of optical lenses disposed on the upper shell and corresponding to the plurality of luminous elements, each optical lens having a protruding top surface and configured to condense light from a corresponding one luminous element of the plurality of luminous elements:

wherein a plurality of annular enclosure walls are connected to an inner side of the upper shell and corresponding to the plurality of luminous elements, each enclosure wall also contact with the first surface and surrounding the corresponding one luminous element, an inner surface of each enclosure wall, an inner surface of a corresponding one optical lens of the plurality of optical lenses and the first surface form a mounting chamber, the corresponding one luminous element is located in the mounting chamber, wherein a gap is located between the corresponding one luminous element and the corresponding one optical lens.

* * * * *